H. E. COFFIN.
CLUTCH.
APPLICATION FILED NOV. 6, 1908.

935,644.

Patented Oct. 5, 1909.

Witnesses

Inventor
Howard E. Coffin
By Whittemore Hulbert Whittemore
Attys

UNITED STATES PATENT OFFICE.

HOWARD E. COFFIN, OF DETROIT, MICHIGAN, ASSIGNOR TO CHALMERS-DETROIT MOTOR COMPANY, OF DETROIT, MICHIGAN, A CORPORATION OF MICHIGAN.

CLUTCH.

935,644.   Specification of Letters Patent.   Patented Oct. 5, 1909.

Application filed November 6, 1908. Serial No. 461,417.

*To all whom it may concern:*

Be it known that I, HOWARD E. COFFIN, a citizen of the United States of America, residing at Detroit, in the county of Wayne and State of Michigan, have invented certain new and useful Improvements in Clutches, of which the following is a specification, reference being had therein to the accompanying drawings.

The invention relates to friction clutches of that type comprising conical male and female members, and the invention consists in certain features of construction as hereinafter set forth.

Figure 1:
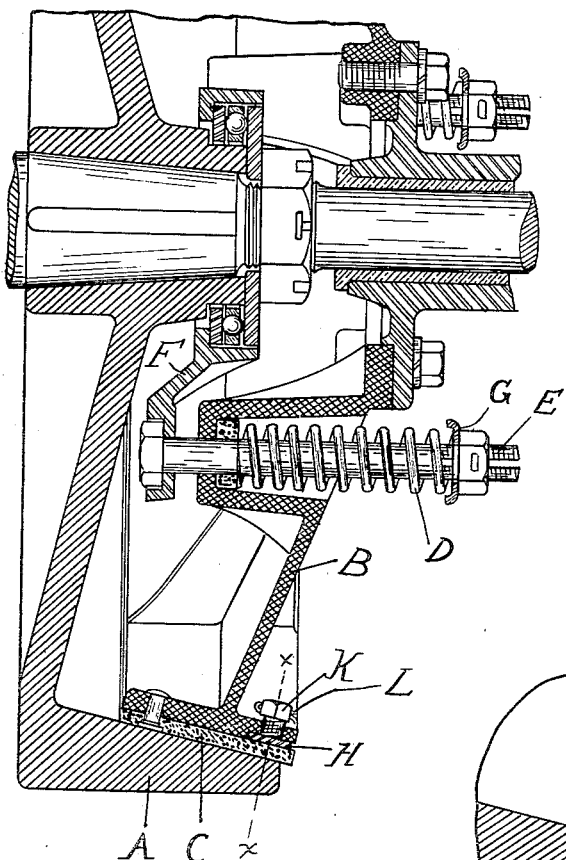
Figure 3:
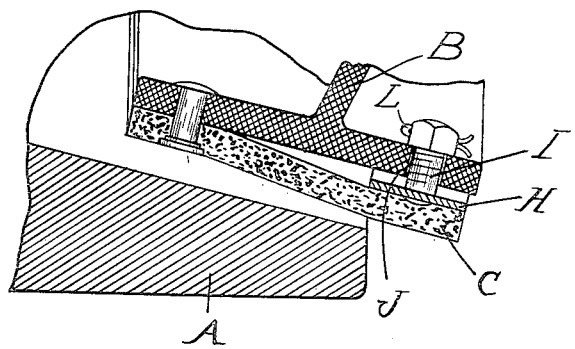
Figure 2:
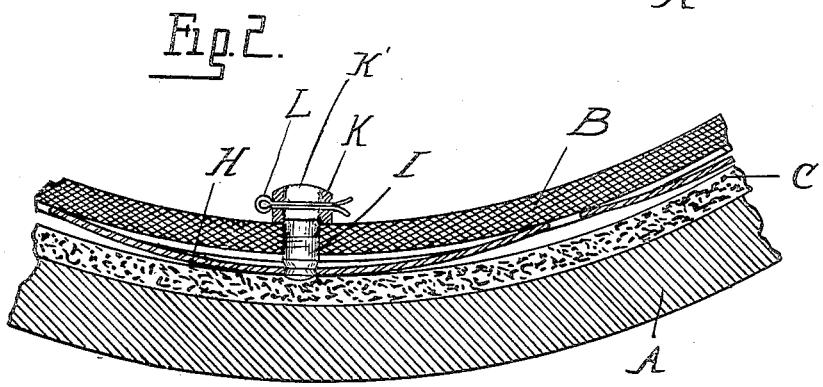

In the drawings—Figure 1 is a longitudinal section through the clutch; Fig. 2 is a section on line x—x, Fig. 1: Fig. 3 is a view similar to Fig. 1 showing a different adjustment of the parts.

With the type of clutch to which my improvement applies, it is customary to provide the male member with a facing of flexible material, such as leather, secured at one edge and yieldingly pressed outward by reinforcing springs, the latter being placed between the facing and the metallic head. The function of these springs is to make the gripping of the clutch more gradual, and by variation in the tension or the amount of movement permitted different effects may be produced.

It is the object of the present invention to provide means by which these springs may be readily adjusted without dismounting the clutch.

As illustrated, A is the female member which may be formed by the flange of the motor fly wheel, B is the male member, and C is the facing of flexible material therebetween.

The members of the clutch are normally held in engagement by springs D which are sleeved upon studs E secured to a revoluble member F mounted upon the hub of the member A. The springs D abut against the collars G upon the studs and bear with their opposite ends against recessed bearings in the member B, whereby the latter is yieldingly pressed into engagement with the member A.

The flexible facing C is reinforced by a series of leaf springs H interposed between said facing and the head B. Each of these springs is centrally secured to a pin or stud I which latter projects through an aperture J in the flange of the member B. The inner ends of these studs or pins are threaded and nuts K are in engagement therewith.

L is a spring pin or other locking device for holding the nuts in different positions of adjustment, and which engages with a slot K' in the pin.

With the construction described, the springs H may be adjusted by withdrawing the pins L and adjusting the nuts K so as to increase or diminish the amount of free movement permitted to the spring in flexing. By such adjustment any desired effect in the operation of the clutch will be obtained. If it is necessary to remove or replace any of the springs, this may be done by disengaging the pin or locking device L and removing the nut K from the stud I, after which the latter may be withdrawn from the aperture J and the spring removed while the members of the clutch are in assembled relation.

What I claim as my invention is:

1. In a clutch, the combination with male and female members, of a flexible facing on one of said members, a removable reinforcing leaf spring for said facing, a stud secured to said spring and extending through a bearing on the clutch member, and an adjustable nut on said stud for limiting the movement of said spring.

2. In a clutch, the combination with male and female clutch members, of a flexible facing on one of said members, a removable reinforcing leaf spring interposed between the flexible facing and the member carrying the same, and means for adjusting said spring.

3. In a clutch, the combination with male and female clutch members, of a flexible facing on one of said members, a removable reinforcing leaf spring for said facing, and means for adjusting the spring, the movement of said spring from the member carrying the same being positively limited.

4. In a clutch, the combination with male and female clutch members, of a flexible facing on one of said members, a reinforcing leaf spring for said facing, removable and replaceable while said members are in assembled relation, and means for limiting the free movement of said spring.

In testimony whereof I affix my signature in presence of two witnesses.

HOWARD E. COFFIN.

Witnesses:
 NELLIE KINSELLA,
 W. J. BELKNAP.